April 20, 1954  J. C. LACHAISE  2,675,777
PNEUMATIC VIBRATING DEVICE
Filed Sept. 23, 1952
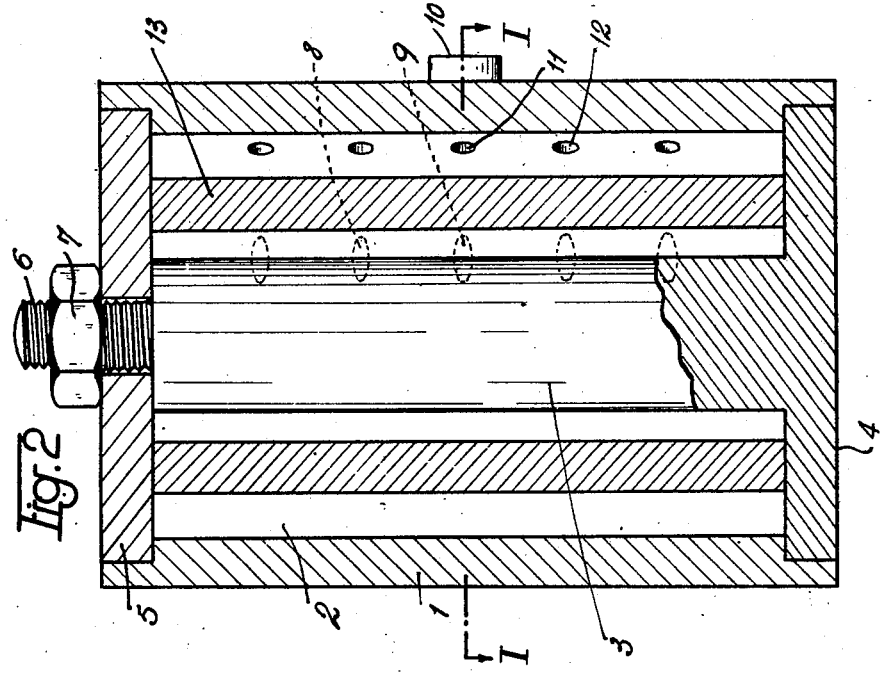
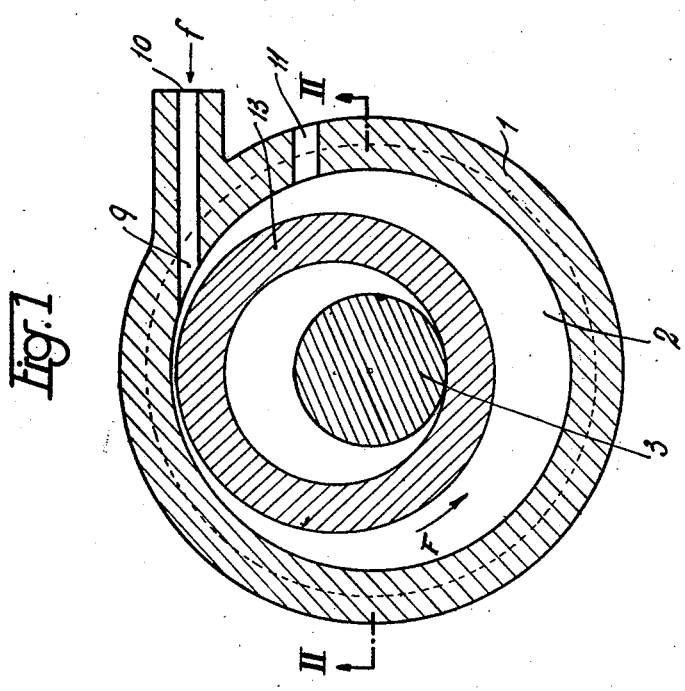
Inventor
Jean C. Lachaise
by Malcolm W. Fraser
attorney

Patented Apr. 20, 1954

2,675,777

UNITED STATES PATENT OFFICE 2,675,777

PNEUMATIC VIBRATING DEVICE

Jean Celestin Lachaise, Vitry-sur-Seine, France

Application September 23, 1952, Serial No. 311,101

Claims priority, application France
October 9, 1951

4 Claims. (Cl. 116—137)

Pneumatic vibrators comprising a cylinder provided in a cylindrical enclosure are known, said cylinder being mounted free in said enclosure and the diameter thereof being smaller than the internal diameter of the latter. Experience has shown that when a controlling pressure fluid is delivered into said enclosure, the cylinder starts moving and vibrations take place due to the offcentering of the axis of the cylinder, with respect to that of the enclosure during the operation.

Pneumatic vibrators have also been designed in which, in a cylindrical enclosure, a plurality of cylinders is provided tangent to each other and to said enclosure, so as to form an assembly in which the cylinders are subjected to a hypocycloidal motion along the walls of the enclosure, without having the possibility of moving radially; the arrangement is therefore symmetrical with respect to the axis of the enclosure and the vibrations are due to the fact that the weight of one cylinder at least is smaller than that of the others.

This invention has for its object to provide a vibrating device, which, as a whole, is of the above referred to type, but which is adapted to produce vibrations of greater strength and higher frequency and is of a simpler structure so that the cost of producing same is substantially reduced.

A device according to the invention comprises, in combination, a cylindrical enclosure provided with at least one fluid admission aperture and at least one fluid exhaust aperture, a central shaft provided co-axially with said enclosure, and a hollow cylindrical roller fitted about said shaft the internal and external diameters of which are such that it cannot be tangent to said enclosure.

The roller, then, is like a piece of tube and the outer surface of said roller may be co-axial or not with its inner surface.

A characteristic feature of the invention is that the fluid admission apertures are so placed that the fluid may be admitted substantially in a direction tangent to the enclosure.

When fluid is admitted in such a device, one may see that the roller moves in a hypocycloidal motion with respect to the internal shaft, so that one generatrix of its outer surface moves in the same direction as the flow of fluid admitted in the enclosure. As a rule, no friction will occur between the roller and the flow of fluid as in the devices hereinabove referred to.

This particular feature makes it possible to have on the outer surface of the roller longitudinal ridges or grooves, increasing the driving action of the air flow, which is not possible in the apparatuses of the above mentioned types; in such apparatuses, indeed, said grooves would have the effect of tending to cause the roller to rotate in a direction opposite to the one imposed on it by its motion along the inner surface of the enclosure.

Among the other advantages offered by this arrangement is the fact that no control valves must be provided for the admission of fluid as in the first type of vibrating apparatus referred to at beginning of this specification.

Further characteristics of the invention will appear from the following description, with reference to the attached drawings given by way of nonlimitative example:

In the drawings:

Fig. 1 is a transversal sectional view of an apparatus according to the invention along I—I of Fig. 2.

Fig. 2 is an elevational sectional view of said apparatus along II—II of Fig. 1.

As shown on the drawing, the apparatus comprises a cylindrical jacket 1 which is hollow so as to provide a cylindrical enclosure 2 in which is secured a fixed shaft 3, said enclosure 2 is closed by two plates 4 and 5 and the shaft 3 may be either integral with the plate 4 or of one piece with it; the extremity 6 of said shaft is threaded and extends through the plate 5 which allows the two plates 4 and 5 to be jammed on the jacket 1 by means of a nut 7.

Said jacket has a plurality of admission apertures such as 8 and 9, supplied with compressed fluid through a pipe 10, through the intermediary of an air box provided on a generatrix of the jacket 1.

Said jacket 1 has also a plurality of exhaust apertures such as 11 and 12 opening in the outer air.

In the enclosure 2 is a hollow cylindrical roller 13, fitted around the shaft 3 the internal and the external diameters of which are so determined that said roller be never tangent to the internal surface of the jacket 1.

In the example illustrated, the axes of the inner and outer surfaces of the roller 13 coincide, but it is obvious that it is not necessary that such a condition be achieved and said two axes coincide, the roller 13 having thus a variable diameter.

As shown more particularly on Fig. 2, the surfaces of the extremities of said roller 3 are substantially tangent to the inner surfaces of the plates 4 and 5.

When pressure fluid is admitted in said apparatus through the pipe 10, the roller 13 rolls along the shaft 3 so that its outer surface moves in the direction of the arrow F, namely in the same direction as the controlling fluid (arrow $f$). Therefore no friction takes place between the control fluid and the outer surface of the roller which is particularly advantageous and the fact that the roller 13 and the jacket I are not tangent makes it possible to have on the outer surface of said roller 13 ridges, grooves, etc. which increase the action of the fluid on said roller.

As it is readily apparent to a man in the art, the frequency of the vibrations may be modified by acting on the pressure of the controlling fluid (which controls the speed of the fluid in the apparatus owing to its expansion) and the strength of the vibrations by acting on the mass of the roller 13 and/or offcentering the inner surface of said roller with respect to its outer surface.

Of course, the embodiment which has just been described is only a non-limitative example and any modification can be made in its details without departing from the limits of this invention.

In the embodiment illustrated, the admission apertures, more particularly, are provided on one generatrix of the jacket; a plurality of series of admission orifices could be provided, each one being on one generatrix. It is the same for the exhaust orifices.

In the same way, the surfaces of the extremities of the roller 13 might be provided with an antifrictional ring. Also, the roller 13 might be formed by several pieces of various densities assembled together.

What I claim is:

1. Pneumatic vibrating apparatus comprising a cylindrical enclosure with at least one aperture for the admission of a controlling fluid and at least one aperture for the exhaust of said fluid, a shaft secured co-axially with and in said enclosure, and a hollow cylindrical roller fitted around said shaft, the length of which is substantially equal to the inner axial length of said enclosure, the inner and outer diameter of said roller being such that it may not be tangent to said enclosure.

2. Pneumatic vibrating apparatus according to claim 1, wherein said cylindrical enclosure comprises several series of admission apertures.

3. Pneumatic vibrating apparatus according to claim 1, wherein said cylindrical enclosure comprises several series of exhaust apertures.

4. Pneumatic vibrating apparatus according to claim 1, wherein said outer cylindrical surface of said roller is formed with grooves and ridges the effect of which is to increase the action of the controlling fluid on said roller.

References Cited in the file of this patent

UNITED STATES PATENTS

| Number | Name | Date |
|---|---|---|
| 2,053,982 | Weiss | Sept. 8, 1936 |
| 2,528,515 | Heigis | Nov. 7, 1950 |